(12) United States Patent
Kim et al.

(10) Patent No.: US 6,754,654 B1
(45) Date of Patent: Jun. 22, 2004

(54) SYSTEM AND METHOD FOR EXTRACTING KNOWLEDGE FROM DOCUMENTS

(75) Inventors: Michael F. Kim, Austin, TX (US);
Justin B. Petro, Austin, TX (US);
Aman H. Shah, Austin, TX (US);
Sahala Swenson, Austin, TX (US);
Elliot L. Waingold, Seattle, TX (US)

(73) Assignee: Trilogy Development Group, Inc., Austin, TX (US)

( * ) Notice: Subject to any disclaimer, the term of this patent is extended or adjusted under 35 U.S.C. 154(b) by 134 days.

(21) Appl. No.: 09/968,766

(22) Filed: Oct. 1, 2001

(51) Int. Cl.[7] .............................................. G06F 17/30
(52) U.S. Cl. ............................................ 707/4; 707/3
(58) Field of Search ............................. 707/4, 5, 6, 10, 707/102, 104.1, 3; 700/83; 704/9; 709/201, 203; 715/513

(56) References Cited

U.S. PATENT DOCUMENTS 6,182,091 B1 * 1/2001 Pitkow et al. ............ 715/501.1
6,510,406 B1 * 1/2003 Marchisio ..................... 704/9

OTHER PUBLICATIONS

Jiawei Han, Towards on–line analytical mining in large databases, 1998, ACM Press, vol. 27, Issue 1, pp. 97–107.*
*IBM Intelligent Miner for Text*, Fact Sheet obtained from internet at <http://www–4.ibm.com/software/data/iminer/fortext/download/factsheet.pdf>, 1999.
*The Trillium Control Center* (Figure) obtained form internet at <http://www.trilliumsoft.com/softwareanim.htm>, printed Feb. 6, 2001.

Gray, Jim et al., *DataCube: A Relational Aggregation Operator Generalizing Group–By, Cross–Tab, and Sub–Totals;* Microsoft Research, Advanced Technology Division, Microsoft Corporation, pp. 1–9, obtained from internet at <http://citeseer.nj.nec.com/cache/papers2/cs/12668/ftp:zSzzSzftp.research.microsoft.comzSzpubzSztrzSztr–95–22.pdf/gray96data.pdf> (printed May 7, 2001)., Feb. 5, 1995 and revised Oct. 18, 1995.

Barbara, Daniel and Wu, Xintao, George Mason University, *The Role of Approximations in Maintaining and Using Aggregate Views,* IEEE Computer Society, vol. 22 No. 4, pp. 15–21., Dec. 1999.

* cited by examiner

*Primary Examiner*—Diane D. Mizrahi
*Assistant Examiner*—Apu Mofiz
(74) *Attorney, Agent, or Firm*—Hamilton & Terrile, LLP

(57) ABSTRACT

A program product characterizes a set of information to determine common characteristics among subsets of the set of information. The program product includes computer instructions which obtain characteristic data that describe characteristics of an entity. For example, the characteristic data may include titles of individuals within an organization. The computer instructions also obtain a set of information associated with the entity (e.g. a set of e-mail messages, Web pages, business memoranda, etc.) The computer instructions identify key terms within the set of information and classify the set of information into at least first and second subsets. In addition, the computer instructions characterize the first subset as more important than the second subset, based on the key terms and the characteristic data. For example, a subset of documents associated with officers of a company may be characterized as more important than a subset of documents associated with temporary employees.

52 Claims, 6 Drawing Sheets

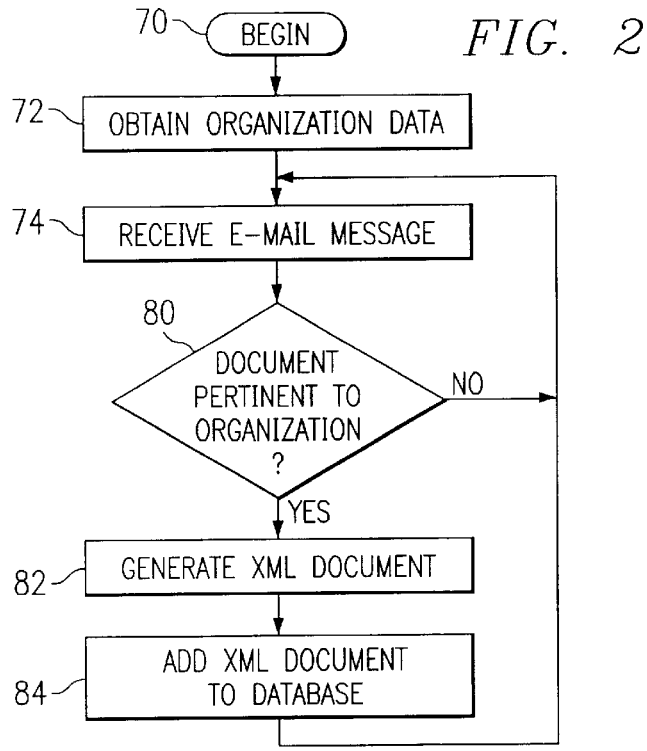

FIG. 2

```
<?xml version="1.0"?>
<email1>
<time>04/17/2001 13:49</date>
<from>Adam Jones</from>
<to>Bob Smith</to>
<cc>Chris Brown</cc>
<subject>Sales proposal</subject>
<body>Bob, Please find attached ...</body>
<attachments>Q1.doc, Q2.doc</attachments>
</email1>
<email2>
<time>04/17/2001 14:00</date>
<from>Bob Smith</from>
<to>Adam Jones</to>
<cc>Chris Brown</cc>
<subject>Sales proposal</subject>
<body>Adam, The figures do not ...</body>
</email2>
    .
    .
    .
```

| TITLE | NAME | SUPERVISOR'S TITLE |
|---|---|---|
| CEO | MAX WHITE | NULL |
| V. P. MARKETING | ED BLACK | CEO |
| V. P. SOFTWARE DEVELOPMENT | BOB SMITH | CEO |
| MANAGER, AUTOMOTIVE PROJECTS | ADAM JONES | DIRECTOR, SOFTWARE DEVELOPMENT |
| MANAGER, TELECOM PROJECTS | CHRIS BROWN | DIRECTOR, SOFTWARE DEVELOPMENT |
| ... | ... | ... |

| TIME | FROM | TO | CC | SUBJECT | BODY | ATTACHMENTS |
|---|---|---|---|---|---|---|
| 04/17/2001 13:49 | ADAM JONES | BOB SMITH | CHRIS BROWN | SALES PROPOSAL | BOB, PLEASE FIND ATTACHED ... | Q1.doc, Q2.doc |
| 04/17/2001 13:02 | DORIS JONES | ADAM JONES | | GROCERIES | DON'T FORGET TO PICK UP SOME ... | |
| 04/17/2001 14:00 | BOB SMITH | ADAM JONES | CHRIS BROWN | SALES PROPOSAL | ADAM, THE FIGURES DO NOT ... | A1.doc |
| 04/17/2001 14:10 | CHRIS BROWN | ADAM JONES | BOB SMITH | SALES PROPOSAL | PLEASE ADD THE ITEMS IN ... | |
| ... | ... | ... | ... | ... | ... | ... |

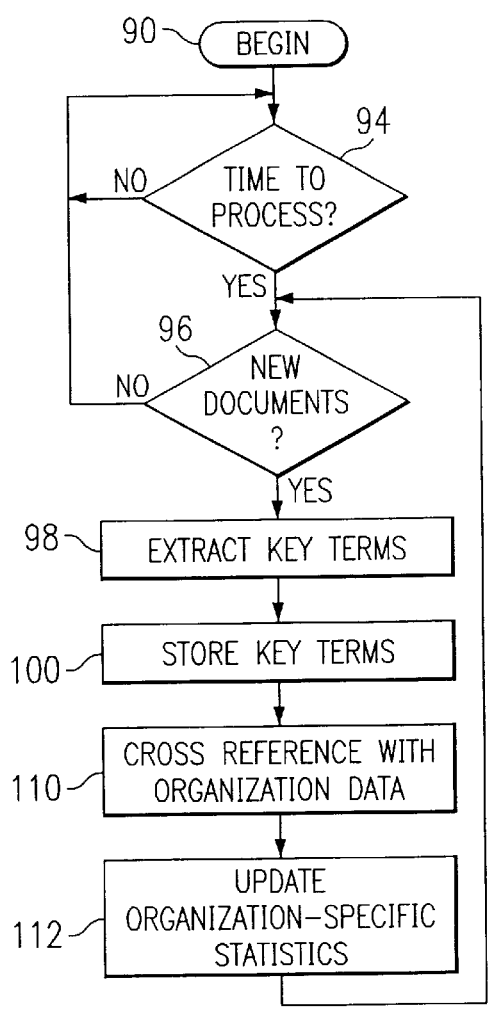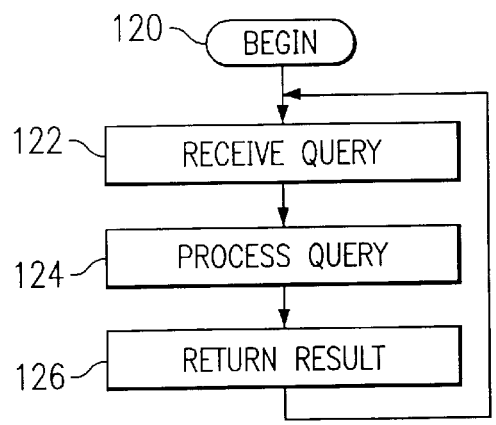

SYSTEM AND METHOD FOR EXTRACTING KNOWLEDGE FROM DOCUMENTS

CROSS-REFERENCE TO RELATED APPLICATION

This application is related to U.S. Ser. No. 09/968.953, entitled SYSTEM AND METHOD FOR PRESENTING STATISTICS, filed on Oct. 1, 2001, and naming as inventors Michael Kim et al. (hereinafter "the 0114 Application").

TECHNICAL FIELD OF THE INVENTION

This invention relates in general to the field of data processing. More specifically, this invention relates to automated systems and methods for analyzing collections of documents to extract important information from the collections.

BACKGROUND OF THE INVENTION

An enormous amount of information is contained in data processing systems around the world. For example, a single large business organization typically has multiple banks of e-mail servers containing millions of e-mail messages for thousands of employees. In addition, organizations often have thousands of personnel records stored on one or more different systems, such as mini or mainframe computer systems. Additional kinds of information typically kept include marketing materials, technical reports, business memoranda, and so on, stored in various types of computer systems.

For instance, organizations typically use different programs to create and modify different kinds of information and typically use many different kinds of hardware, operating systems, file systems, and data formats to store the information. When stored, the information is typically organized into discrete records containing closely related data items. For example, a typical e-mail server stores each e-mail message as a separate row in a single database file, with multiple columns within the row holding the data that constitutes the message. Likewise, some personnel systems store each employee's personnel data as related records in one or more files, with multiple fields in each record containing information such as employee name, start date, etc. Similarly, a Web server may store each Web page as lines of text in a file or a group of related files. However, despite the differences in file format and such used for different types of information, each e-mail message, each Web page, each employee's personnel data, and each similar collection of information is referred to as a "document."

When organization databases grow to contain thousands or millions of documents, traditional tools for retrieving data, such as search and sort functions, lose much of their practical utility. For example, when millions of e-mail messages are available, searching for a particular message or for a message relating to a particular topic is like trying to find a needle in a haystack. In such a situation, the individual performing the search is faced with too much information (TMI), and the knowledge embedded within the stored information remains largely untapped.

In recent years, some businesses have attempted to utilize the large pools of information on their data processing systems to greater advantage by analyzing that information with techniques known generally as data mining. As defined by the Microsoft Press Computer Dictionary, data mining is "the process of identifying commercially useful patterns or relationships in databases or other computer repositories through the use of advanced statistical tools" (4th ed., p. 125).

As one example, a cluster tool organizes documents into groups based on the contents of the documents. For instance, a business with customer complaint e-mails could identify areas of concern by using a cluster tool to group related customer complaints together. By contrast, traditional search techniques require the user to know in advance what characteristics are important. For example, with a traditional search function, an automobile manufacturer specifies a specific term, such as "engine," to determine whether engine complaints are numerous. A cluster tool, on the other hand, groups complaints into subject areas, thereby highlighting areas of concern that the manufacturer might not otherwise think to explore.

However, a number of disadvantages are associated with conventional data mining systems, including shortcomings relating to the amount of time required to produce results, the pertinence of the results to the organization using those results, and the ability to analyze documents from different time periods, particularly when the analysis involves documents that have been archived.

SUMMARY OF THE INVENTION

Embodiments of the present invention provide a system and method for extracting knowledge from documents. In one embodiment, a data mining system according to the present invention includes a data retrieving component, a data integrating component, and a query manager. The data retrieving component and the data integrating component cooperate to generate intermediate data, such as marked-up documents, key term vectors, and/or data cubes, based on raw documents, such as e-mail messages, associated with an organization. The query manager uses the intermediate data to respond to queries relating to the raw documents.

In another embodiment, the data integrating component generates and stores the intermediate data automatically and substantially independently of the query manager. For instance, the intermediate data may be generated and stored according to a sampling period.

In another embodiment, the data retrieving component identifies which raw documents are pertinent to the organization, based on characteristic data for the organization (i.e., organization data), such as personnel records. In this embodiment, the data retrieving component filters the raw documents by generating marked-up documents for the raw documents identified as pertinent. For example, if processing e-mail messages, the data retrieving component may generate marked-up documents only for e-mail messages which were both sent and received by members of the organization.

Additional embodiments provide other technological solutions which facilitate knowledge extraction.

BRIEF DESCRIPTION OF THE DRAWINGS

A more complete understanding of the invention and its objectives and advantages may be acquired by referring to the following description and the accompanying drawings, wherein:

FIG. 2 presents a flow chart of a process for generating marked-up documents from raw documents;

FIG. 3 is a table depicting organization data;

FIG. 4 is a table depicting data in an e-mail system;

FIG. 5 depicts a data file containing marked-up documents;

FIG. 6 is a flow chart depicting a process for periodically generating organization-specific data from marked-up documents;

FIG. 8 is a flow chart depicting a process for processing requests from users.

DETAILED DESCRIPTION

Overview

Figure 1:
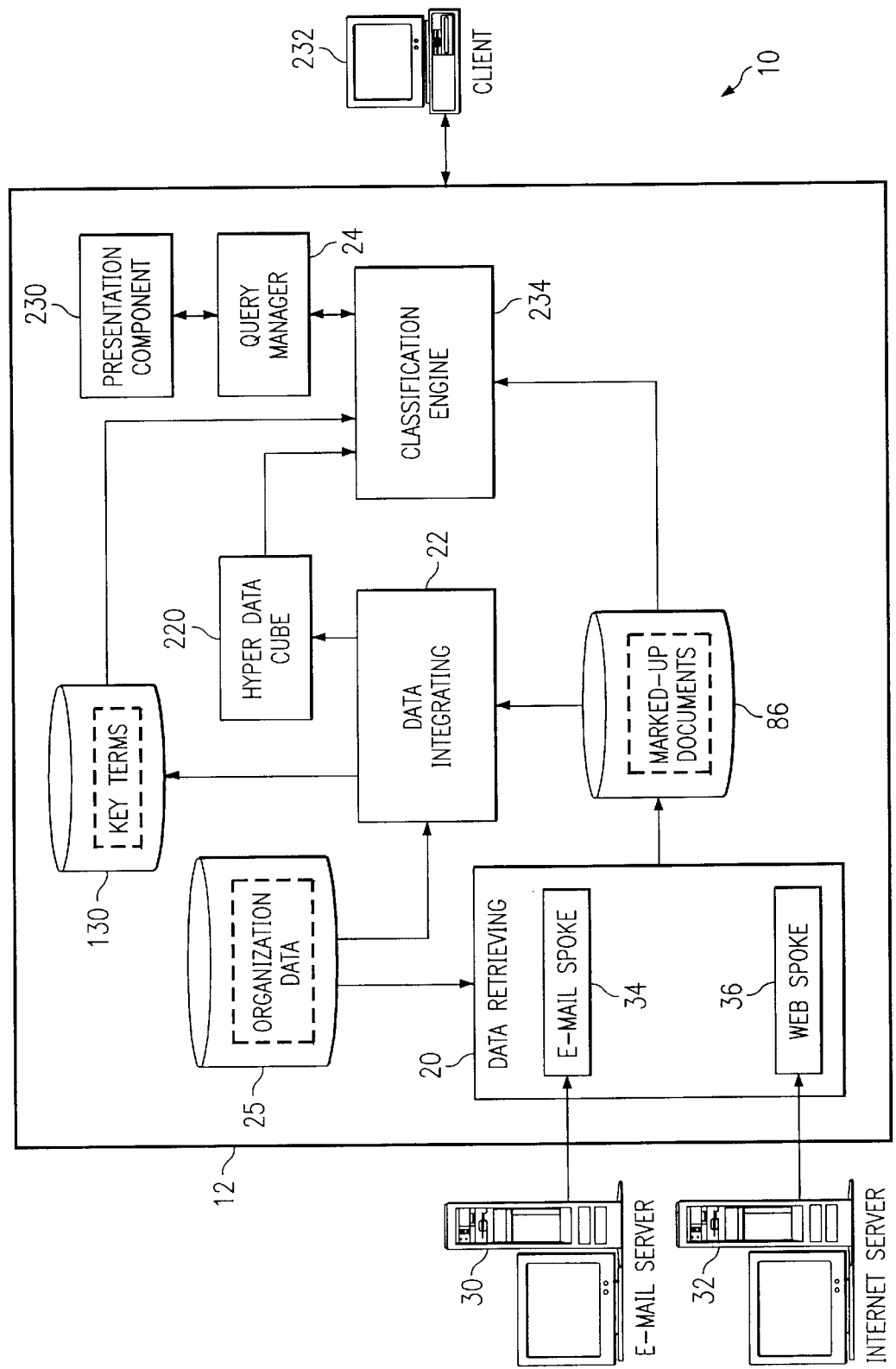
FIG. 1 presents a block diagram of an example data mining system.

Among the disadvantages associated with conventional data mining systems is the substantial amount of time required to perform each data mining analysis, particularly when analyzing millions of documents. The time consuming operations performed by conventional data mining systems include a data preprocessing step to extract data from raw documents and a statistical processing step to extract knowledge from the extracted data. A conventional data mining tool performs both of those steps for each analysis. Such a tool therefore does not produce results rapidly and ties up computing resources for significant periods of time.

Another disadvantage of conventional data mining systems is that when an organization performs data mining, the analysis typically does not factor in specific characteristics of that organization. Consequently, the results may not reveal the knowledge of primary importance to the organization. Although some data mining tools allow users to perform customized analyses, such customization requires additional input from the users and additional computing time for each different analysis.

Furthermore, conventional data mining systems typically are not well suited for analysis of information that changes over time, in that a completely new analysis is required whenever a different set of documents is to be included. Each analysis, moreover, requires substantial data processing resources, and the user therefore experiences a substantial delay while awaiting the results.

In addition, organizations with large databases typically archive older data by moving that data from readily accessible storage mechanisms, such as hard drives, to other storage media, such as tapes or optical disks. Archiving reduces the amount of hard drive space that would otherwise be required, but archiving also substantially increases the time required to access the archived data. Consequently, in conventional data mining systems, the problem of poor response time is exacerbated when some of the information is no longer readily available, for example as a result of having been archived to tape.

The consumption of processing resources and response time problems mentioned above also make conventional data mining systems poorly suited for detecting trends over different time periods. These and other disadvantages limit the practical utility of conventional data mining systems.

A need has therefore arisen for improved systems and methods for mining data. For example, organizations would benefit from data mining systems and methods that provide results upon request more rapidly. Additional benefits would be realized from data mining systems and methods that provide results rapidly even when the raw documents forming the basis of the analysis are relatively inaccessible. Further benefits would be provided by data mining systems and methods that automatically factor in characteristics of organizations when analyzing documents for those organizations, so that an analysis automatically identifies information of particular importance to a particular organization without specific user guidance.

As summarized above and described in greater detail below, various embodiments of the present invention provide such technical advantages. For instance, in some embodiments that generate the intermediate data automatically and independently, the intermediate data allow queries to be processed more rapidly than is possible when resorting to raw data for each analysis. When the intermediate data include data cubes, those data cubes further expedite the processing of requests involving aggregate data along any of the data cubes' multiple dimensions. Furthermore, the intermediate data allow the query manager to process queries relating to raw documents even after some of those raw documents have been archived.

In some embodiments that filter the raw documents based on characteristics of the organization, the resulting intermediate data allow the query manager to identify information of particular importance to the organization without specific user guidance. Filtering also further reduces the amount of time and resources required to process queries. Consequently, multiple requests relating to different time periods may be processed more easily and rapidly, relative to conventional data mining systems. Additional advantages will become apparent upon review of the following detailed description, drawings, and claims.

EXAMPLE EMBODIMENT(S)

An example embodiment is described in detail below, and various alternative embodiments are described briefly. However, the invention is not limited to those example embodiments, but is defined by the claims.

For instance, FIG. 1 presents a block diagram of an example embodiment of a data mining system 10 according to the present invention. Data mining system 10 is a program product that includes control logic and data constructs which reside in one or more data processing systems 12. Among the components of data mining system 10 are a data retrieving component 20, a data integrating component 22, and a query manager 24, each of which is implemented as computer instructions. The components operate relatively independently of the others. For example, each component runs within its own virtual machine and uses remote method invocation (RMI) to interact with the other components.

Data processing system 12 operates within a client-server network. Data processing system 12 may act as a server within that network relative to a client data processing system 232 and as a client relative to one or more external data sources, such as an e-mail server 30 and/or an Internet server 32. Data processing system 12 may include data storage, such as read only memory (ROM), random access memory (RAM), one or more hard disk drives, CD-ROM drives, etc., and one or more central processing units (CPUs). Visual output may be presented primarily on displays of remote systems, such as client 232. The different components for data storage, instruction processing, output presentation, etc., are known generally as processing resources.

Data mining system 10 may be implemented, for example, in the JAVA programming language using SUN's JAVA DEVELOPMENT KIT (JDK) version 1.3. In addition, the visualizations may be implemented using JAVASERVER PAGES (JSPs) and JAVA Servlet technology. Any JSP 1.1 and Servlet 2.2 compliant application server/container, such as ALLAIRE/MACROMEDIA's JRun, may be used as the application container to host the JSPs and Servlets. Open source tools such as FLEX and JCup that aid developers in creating robust and flexible parsers in JAVA may be used to write query tools that do real-time parsing of user queries. A standard SQL92 and JDBC compliant database server, such as MICROSOFT IIS Webserver 4.0 communicating with a backend MICROSOFT SQL Server 7.0 database, may be used to deploy data mining system 10. Any available web server could be used with the preceding technology to serve web pages, provided the web server allows third party JSP/Servlet application servers to connect to it to serve the dynamic pages. It will be apparent to those of ordinary skill in the art that other technologies may be used to implement data mining system 10.

Referring now to FIG. 2, a flowchart illustrates the processing performed by data retrieving component 20. The illustrated processing begins at block 70 with data retrieving component 20 executing on data processing system 12. As shown at block 72, data retrieving component 20 then retrieves organization or entity data from one or more files or databases 25, such as the files maintain by an organization's personnel system. For example, as illustrated in FIG. 3, database 25 may contain one or more personnel files 26 with the name, title, department, supervisor, etc., for each member of the organization.

Data retrieving component 20 then enters a processing loop which begins at block 74 with data retrieving component 20 receiving a document, such as an e-mail message or a Web page, from one or more external data sources, such as e-mail server 30 and/or Internet server 32.

For example, with reference to FIG. 4, data retrieving component 20 may obtain e-mail messages from one or more e-mail files 28. Typically, e-mail file 28 will contain messages received by members of the organization from external sources, such as the message from Doris Jones, and messages sent by members of the organization to external recipients. In addition, e-mail file 28 will generally include internal messages, such as the other three messages illustrated in FIG. 4. An internal message is a message having a sender and a recipient who are both members of the organization.

In the illustrated embodiment, data retrieving component 20 includes numerous different spokes for obtaining documents from different data sources, such as an e-mail spoke 34 for monitoring e-mail messages and an Internet spoke 36 for monitoring Web sites. The documents that data retrieving component 20 obtains from external sources are raw documents.

As indicated at block 80, for each raw document obtained, data retrieving component 20 automatically determines whether that raw document is pertinent to the organization. The criteria used to determine pertinence (i.e., the filter criteria) are adapted to the data source being monitored. For example, in one embodiment, e-mail spoke 34 analyzes sender and recipient fields in each e-mail message and filters out all messages except internal messages.

The Internet spoke can take advantage of knowledge of where different WebPages and sites are located and can filter out, for example, all pages except those that come from the corporate intranet. In another embodiment, the Internet spoke can also filter out web pages and sites that do not directly pertain to the corporation's customers (e.g., filtering based on network topology) and thus allow finer grain analysis of customer relationships as well.

The spoke concept can be easily extended to include other various sorts of digital resources. These include, but are not limited to, documents lying in corporate databases and documents lying in various knowledge bases, as well as individual employee contributions to knowledge from their personal collections of documents.

Referring again to block 80 of FIG. 2, if a raw document does not pass the filter criteria, the process returns to the top of the processing loop to receive another document, as indicated by the arrow leading back to block 74. However, if the raw document does pass, data retrieving component 20 then generates a marked-up document from the raw document, as indicated by block 82.

For instance, referring again to FIG. 4, in the illustrated embodiment, data retrieving component 20 receives e-mail messages that contain attributes (e.g., data fields) identifying a sender, a recipient, a subject, a body, and a time for each message. Data retrieving component 20 then generates corresponding marked-up documents with corresponding tags, such as "subject" tags, "time" tags, etc.

Referring now to FIG. 5, in the example embodiment, data retrieving component 20 stores all marked-up documents in one or more files 88, with the content of each document encoded according to standard extensible markup language (XML). In FIG. 5, for instance, the set of lines indicated by bracket 38 includes one marked-up document, and the set of lines indicated by bracket 40 includes another marked-up document. Also, although data retrieving component 20 uses multiple spokes to obtain documents with different formats from different external sources, in the example embodiment the spokes give all of the resulting marked-up documents the same basic file format. Furthermore, data retrieving component 20 may use the same tags to identify similar or identical parts, such as time and subject attributes, of different types of raw documents. Consequently, the other components of data mining system 10 need not handle multiple file formats for data to be analyzed.

Then, as indicated by block 84, data retrieving component 20 stores the marked-up document, for example in a database 86, for use by other components of data mining system 10. The process then returns to the top of the processing loop to receive another document, as indicated by the arrow leading back to block 74.

In one implementation, the above process is used upon initial installation of data mining system 10 to extract and reformat pertinent data from one or more existing sets of information, such as an e-mail database. Further, once initialization is complete, the process is used on an ongoing basis, for example with data retrieving component 20 monitoring data sources, such as e-mail server 30, and generating marked-up documents in real time, thereby ensuring that the marked-up documents include the most current information available.

With reference now to FIG. 6, there is depicted a flowchart of the process performed by data integrating component 22. The illustrated process begins at block 90 with data integrating component 20 executing on data processing system 12. As shown at block 92, data integrating component 22 then retrieves organization data from one or more files or databases 25, such as personnel file 26 of FIG. 3.

At block 94, data integrating component 22 determines whether it is time to process a new batch of marked-up documents. The process does not proceed further until the proper time for the next run has been reached, as indicated by the arrow returning to block 94. For example, in one implementation, data integrating component 22 is configured to process marked-up documents according to a predetermined schedule or predetermined intervals, such as hourly, daily, weekly, etc. In other implementations, different intervals are used to reach a desired balance between consumption of computing resources and needs for the most current information. For example, shorter intervals are typically used when the data being analyzed change frequently.

If the time to process marked-up documents has been reached, data integrating component 22 proceeds to determine whether there are any marked-up documents to process, as shown at block 96. If no new marked-up documents have been stored by data retrieving component 20 since data integrating component 22 performed its last processing run, the process returns to block 94 to await the time for the next scheduled execution.

However, if one or more new marked-up documents have been stored, data integrating component 22 reads one of those documents, filters out filler words, and extracts key terms from that document, as indicated at block 98. Conventional text analysis tools may be used to extract the key terms. As shown at block 100, the key terms are then stored for use by query manager 24. Specifically, in the example embodiment, the key terms from each document are stored as a key term vector in a database 130. In addition to identifying a documents' key terms, a key term vector specifies a frequency count for each key term in the document.

As indicated at block 110, in the example embodiment, data integrating component 22 uses both the data in the marked-up document and the organization data to generate many different kinds of summary statistics. As explained below, query manager 24 uses those summary statistics to rapidly perform many different kinds of analyses.

In the example embodiment, the processing depicted at step 110 includes an initial stage in which data integrating component 22 determines which "units" of the organization are associated with each document. That is, data integrating component 22 treats the organization as a collection of units. For instance, each person within the organization is considered a unit, and people are grouped into other units, such as departments.

For example, with reference to FIG. 3, when processing data from an e-mail message, data integrating component 22 determines who the sender and recipient were, thus identifying two of the units associated with that document. Also, data integrating component 22 cross references the sender and recipient with the organization data (e.g., the personnel records, the files defining the organization's e-mail distribution lists, etc.) to identify additional units associated with the message. For instance, in one embodiment, data integrating component 22 cross references to the name, title, and supervisor fields depicted in FIG. 3. Thus, data integrating component 22 may determine, for example, that a message is also associated with two different departments, such as marketing and software development, and two different vertical sections of the organization, such as one section focused on serving the telecommunications industry and another section focused on serving the automotive industry. In such a manner, data integrating component 22 may determine that many different units of the organization are involved with each document. For example, the units involved in the above example would be the following: at one level—the individuals identified as sender and recipient; at a different level—the departments of each of those individuals; and at yet another level, the vertical sections of those individuals.

Similar techniques are used to identify units associated with other types of documents. Since the summary statistics are generated by integrating the documents with the organization data, the summary statistics are also known as organization-specific or entity-specific summary statistics.

As indicated at block 112, after determining which units of the organization are associated with the current document, data integrating component 22 uses those findings to update a tally summarizing the findings from all of the documents in the processing run. Specifically, data integrating component 22 stores those results in a data cube. That data construct allows query manager 24 to compute responses to queries more rapidly than is possible with conventional data mining systems.

Figure 7:
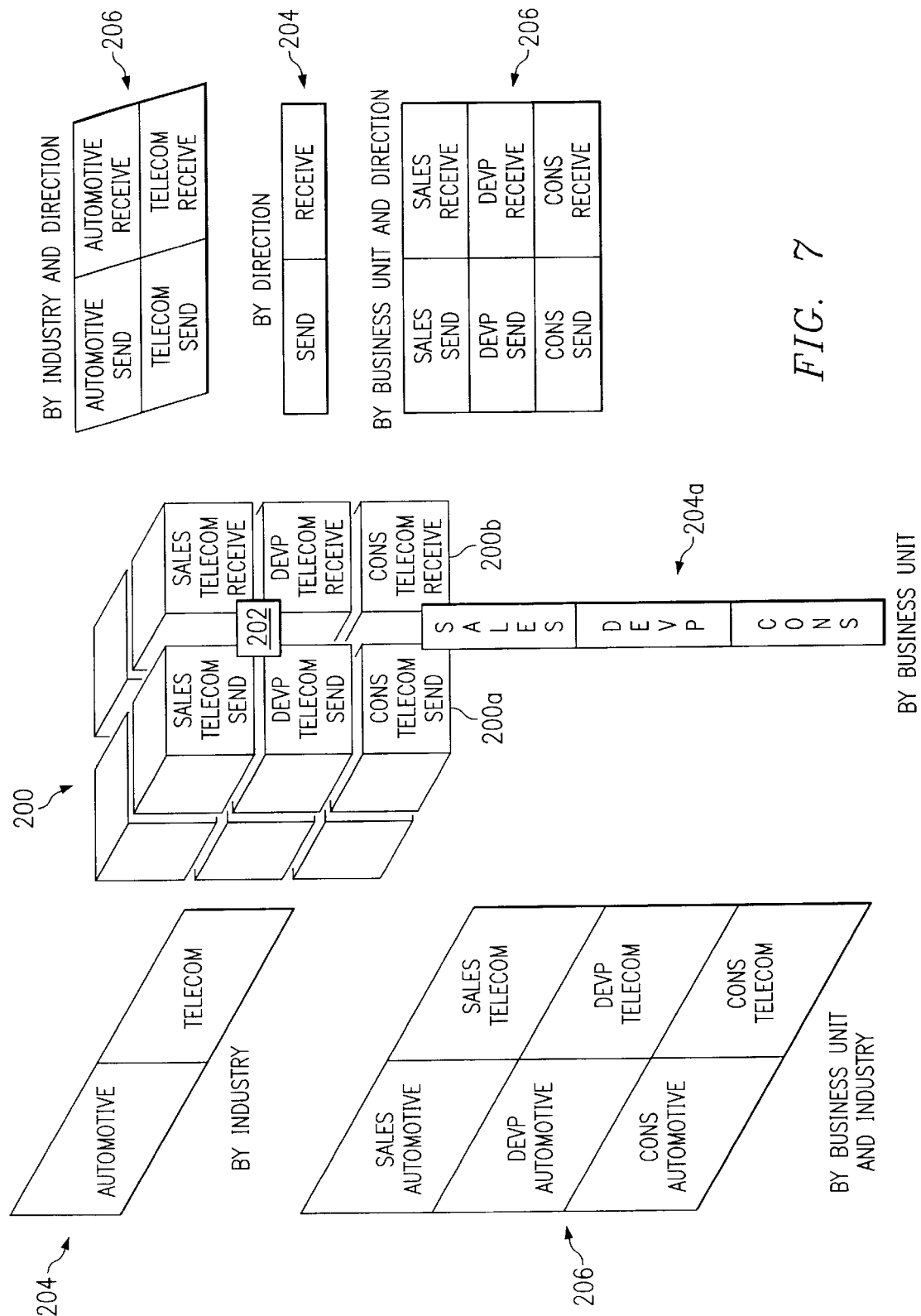
FIG. 7 depicts an example data cube for holding organization-specific document statistics.

Referring now also to FIG. 7, a data cube is a data construct with three or more logical dimensions containing at least (a) a set of core cells 200 encoding specific data points, (b) a grand total point 202, (c) a subtotal line 204 for each pair of dimensions, and (d) a subtotal plane 206 for each pair of dimensions. In particular, FIG. 7 depicts an example data cube representing a logical data structure for holding the results of the above analysis. The data cube in FIG. 7 has three dimensions: Industry, Department, and Direction. As shown, the Industry dimension includes two values (i.e., Automotive and Telecom), the Direction dimension includes two values (i.e., Send and Receive), and the Business Unit dimension includes three values (i.e., Sales, Development, and Consulting). Consequently, subtotal line 204a, for example, contains values indicating how many total e-mail messages were sent and received by the sales department, how many were sent and received by the development department, and how many were sent and received by the consulting department.

The number of values for each dimension also results in core cells 200 forming a two-by-two-by-three cube of cells. Each cell contains the data for one particular combination of the values for each dimension. For example, the sender and recipient of a particular message may both belong to the consulting department. The sender and recipient may both also belong to the industry vertical section associated with the telecom industry (i.e., the Telecom vertical). Therefore, when processing such a message, data integrating component 22 increments the values in core cells 200a and 200b. As a result, grand total point 202, subtotal lines 204 and 204a, and subtotal planes 206 would also reflect those incremented values. Each cell therefore contains summary data for one particular subset of documents.

In alternative embodiments, data cubes have more than three dimensions. For example, a data cube that contains organization-specific document statistics derived from e-mail messages include all of the dimensions described above, as well as dimensions for counting e-mail messages between each pair of units within the organization.

As illustrated in FIG. 6 by the arrow returning to block 96 from block 112, after each document has been analyzed and the results of that analysis stored, data integrating component 22 determines whether any more documents remain to be processed. If any documents remain, each is processed in the manner described above. After all documents have been processed, the flow returns to block 94 to await the proper time for the next execution.

In the example embodiment, data integrating component 22 creates a new data cube to hold the results of each periodic execution. For example, if data integrating component 22 runs once per day, a new data cube is created every day, encoding the results of that day's analysis. The period for each consecutive execution of the above process is known as a sampling period. Also, a collection of data cubes containing data from consecutive sampling periods is known as a hyper data cube 220.

Referring now to FIG. 8, there is depicted a flowchart of the processing performed by query manager 24. The illustrated processing begins at block 120 with query manager 24 executing on data processing system 12. As shown at block 122, query manager 24 then receives a request or query relating generally to the raw documents that were processed by data retrieving component 20 and data integrating component 22. In the example embodiment, query manager 24 receives requests from a presentation component 230 of data mining system 10, and presentation component 230 typically generates the requests based on user input received from Web browsing software running in one or more client data processing systems 232.

After receiving a query, query manger 24 processes the query, as shown at block 124. At this point in time, data retrieving component 20 and data integrating component 22 will have already processed the raw data by steps such as filtering the documents, saving the content from the pertinent documents in a standardized format, and summarizing the relationships between each document and the business's organizational units, as described above. Query manager 24 uses the intermediate data that were saved by data retrieving component 20 and data integrating component 22 to compute responses to a wide variety of requests more rapidly than would be possible if query manager were required to resort to the raw documents.

For example, if the query requests a list of the topics that were discussed most frequently for a particular period of time, query manager 24 uses the key term vectors in database 130 to quickly identify which terms occurred most often. In one embodiment, query manager 24 identifies those terms using the measure of association known as "simple matching coefficient" (i.e., query manager 24 uses "simple coefficient vector matching").

Query manager 24 also uses the key term vectors to process queries relating to message flow within the organization, such as a request for a summary of how many messages were sent from one or more specified departments to one or more specified departments.

If a query requests a summary of how many messages were sent and received for a particular time period, query manager 24 uses the appropriate data cubes within hyper data cube 220 to quickly respond with that summary. For example, query manager 24 can use data cubes to handle a request for a grand total of messages for a single time period by department, by direction, by industry vertical, or by any combination of those dimensions. Similarly, query manager 24 can use data cubes to handle a request for message count subtotals at predetermined intervals within a single time period. As will be appreciated by those of ordinary skill in the art, the data cubes and key term vectors support numerous additional types of requests as well.

In one embodiment, query manager 24 uses an intermediate component, such as a classification engine 234, to help generate responses to some or all types of queries. Further, classification engine 234 recognizes that fields such as title, department, and supervisor from the organization data reflect the organization's chain of command, and classification engine 234 therefore interprets such fields as importance attributes. Moreover, for certain types of queries, such as a query requesting a list of the most important topics discussed via e-mail in the organization, classification engine 234 analyzes the extracted data from the marked-up documents in light of those importance attributes, giving greater weight to documents associated with higher-level employees, such as the CEO.

The basis of classification based on organizational structure is that most charts of organizational units lend themselves well to tree like structures. Data mining system 10 takes this thinking into account and presents the notion of "drilling down" and "drilling up" along the org chart. Then, at each level within the organizational structure, data mining system 10 recognizes is a separate focus and group of relevant documents. The organization chart is initially provided by the organization but may evolve throughout the lifetime of data mining system 10 based on usage patterns and levels of importance given to certain levels of the organization.

After computing the requested information, query manager 24 returns the results, as indicated at block 126 of FIG. 8, and the flow of the process returns to block 122. Query manager 24 may then repeat the steps described above for each subsequent query that is received.

Data mining system 10 thus cross references the organization data with the intermediate data during querying time, which enables data mining system 10 to process many different kinds of user queries. For example, if a user submits a query to see the amount of communication going on between users in the development group and users in the Computer vertical, an embodiment of the data mining system 10 rapidly garners the requested information by first getting all communications from one group to another and then paring down based on known organization data.

CONCLUSION

Although one or more example embodiments or implementations of the present invention have been described in detail, it should be understood that various changes and substitutions can be made without departing from the spirit and scope of the invention. For example, FIG. 1 depicts data mining system 10 as residing within a single data processing system 12, with input data, such as raw documents and user input, obtained from external data processing systems.

Figure 9:
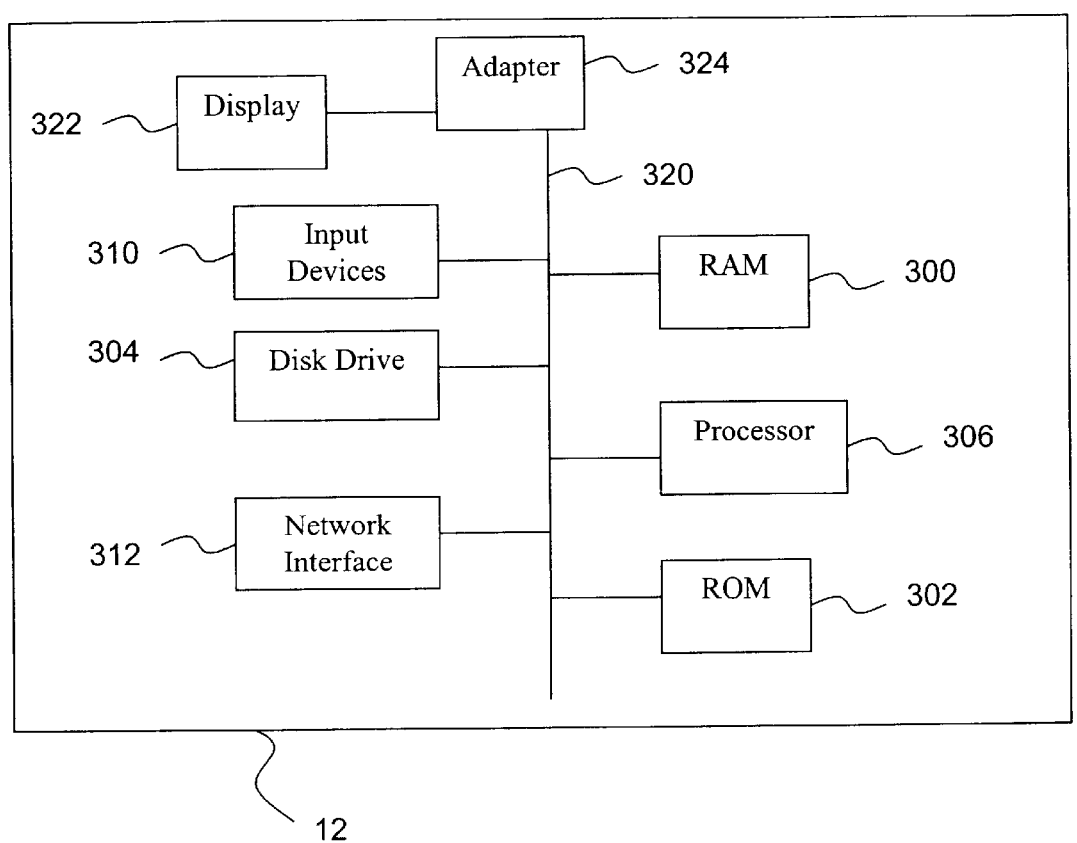
FIG. 9 presents a block diagram of an example data processing system.

With reference to FIG. 9, the processing resources within data processing system 12 may include data storage, such as read only memory (ROM) 300, random access memory (RAM) 302, one or more hard disk drives 304, CD-ROM drives, etc., and one or more central processing units (CPUs) 306. The processing resources may also include input devices 310, such as a keyboard and a pointing device, as well as one or more network interfaces 312, such as Ethernet ports. A display 322 may also be provided, along with a display adapter 324 for driving display 322. One or more buses 320 may be used to interconnect the various processing resources. The control logic and data constructs of data mining system 10 may be stored in nonvolatile data storage, such as in the one or more hard disk drives 304, with some or all of data mining system 10 then loaded into RAM 300 to facilitate execution on the one or more CPUs 306.

However, it should be understood that the present invention may also be implemented in numerous other hardware environments. Data processing systems incorporating the invention may include, without limitation, personal computers, mini computers, mainframe computers, and distributed computing systems. Furthermore, all of the components of the data mining system need not reside on the same data processing system. Moreover, some or all of the external systems, such as the e-mail server and/or the client Web browser, could reside on the same data processing system as the data mining system.

In addition, alternative embodiments of the invention include computer-usable media encoding logic such as computer instructions for performing the operations of the invention. Such computer-usable media may include, without limitation, storage media such as floppy disks, hard disks, CD-ROMs, read-only memory, and random access memory; as well as communications media such wires, optical fibers, microwaves, radio waves, and other electromagnetic and/or optical carriers.

The scope of the invention is therefore not limited to the particulars of the illustrated embodiments or implementations but is defined by the appended claims.

What is claimed is:

1. A method for extracting information from multiple documents, the method comprising:

obtaining electronic documents;

obtaining characteristic data from electronic data sources that describe characteristics of tho entity;

characterizing a document filter based at least in part on the obtained characteristic data of the entity;

identifying which of the documents are pertinent to the entity using the document filter, based on the characteristic data;

generating marked-up documents for the documents identified as pertinent;

generating key terms for substantially each marked-up document; and processing queries relating to the pertinent documents, by using the key terms to identify topics of importance to the entity.

2. The method of claim 1, wherein:

the key terms are organized as vectors and comprise occurrence counts for key terms within the marked-up documents; and the operation of processing queries comprises:
      receiving a query;
      using the occurrence counts to identify the topics of importance; and
      responding to the query by returning the identified topics of importance.

3. The method of claim 2, wherein the operation of processing queries comprises using a simple matching coefficient measure of association to identify the topics of importance.

4. The method of claim 1, wherein:

the entity comprises an organization;

the documents comprise c-mail messages; and the operation of generating marked-up documents comprises generating marked-up documents only for e-mail messages which were both sent and received by units of the organization.

5. The method of claim 1, wherein:

the documents comprise e-mail messages;

substantially each e-mail message includes message attributes identifying a sender, a recipient, a subject, and a body; and generating marked-up documents comprises using one or more of the message attributes to generate corresponding tags for the marked-up documents.

6. The method of claim 1, wherein:

obtaining documents comprises obtaining documents from two or more different types of data sources; and generating marked-up documents comprises giving the marked-up documents a common format.

7. The method of claim 1, wherein each marked-up document comprises items of content and a markup tag for each item of content.

8. The method of claim 7, wherein the markup tags comprise extensible markup language (XML) tags.

9. The method of claim 1, wherein:

the entity comprises an organization;

the characteristic data comprise different attributes for different units of the organization associated with the documents; and the operation of processing queries comprises using the attributes for the different units to process queries.

10. The method of claim 9, wherein the attributes comprise titles of individuals associated with the documents.

11. The method of claim 1, further comprising:

generating entity-specific document statistics, based on the characteristic data; and storing the entity-specific document statistics in one or more data cubes.

12. The method of claim 1 wherein processing queries further comprises using the characteristic data of the entity to identify topics of importance.

13. A method of characterizing a set of information to determine common characteristics among subsets of the set of information, the method comprising:

obtaining characteristic data from a computer accessible database, wherein the characteristic data describe characteristics of an entity;

receiving electronic information;

filtering the received electronic information based in part on the obtained characteristic data of the entity to generate a set of filtered information;

obtaining a set of the filtered information associated with the entity;

executing a data integrating component that automatically identifies key terms within the set of information and uses one or tore vectors to store the key terms in a data processing system;

classifying the set of information into at least fist and second subsets, based on the one or more vectors;

receiving a query relating to the set of information; and in response to the query, automatically using the one or more vectors and the characteristic data for the entity to produce a result which ranks the first subset and the second subset in order of importance.

14. A user interface that displays the result produced by the method of claim 13, wherein the user interface indicates that the first subset is more important than the second subset.

15. The method of claim 13, wherein:

the operation of automatically using the one or more vectors and the characteristic data to produce a result is performed by a query manager; and the method filter comprises:
       transmitting the query to the query manager;
       receiving the result from the query manager; and
       using the result to generate presentation data for display.

16. The method of claim 13, wherein:

the entity comprises an organization;

the set of information comprises e-mail messages; and the method further comprises storing counts of e-mail messages sent from and received by individual units of the organization.

17. The method of claim 13, wherein:

the entity comprises an organization;

the set of information comprises email messages; and the method further comprises storing counts of email messages between individual pairs of units within the organization.

18. The method of claim 13, further comprising:

generating marked-up documents from the set of information;

using the characteristic data and the marked-up documents to generate entity-specific document statistics; and storing the entity-specific document statistics in one or more data cubes.

19. The method of claim 13, wherein:

the set of information comprises documents; and the operation of identifying key terms within the set of information comprises periodically identifying key terms for documents obtained during a predetermined sampling period.

20. The method of claim 19, further comprising:

generating marked-up documents from the documents in the set of information;

processing queries relating to the documents; and storing the identified key terms automatically and substantially independently of the operations for generating marked-up documents and processing queries.

21. The method of claim 20, further comprising:

using the characteristic data and the marked-up documents to generate entity-specific document statistics; and storing the entity-specific document statistics for each sampling period in a different data cube.

22. The method of claim 21, wherein processing queries comprises responding to a query which specifies a time period of interest by consulting the data cubes for the sampling periods within the specified time period of interest.

23. A program product for extracting information from multiple documents, the program product comprising:

computer instructions that:

obtain electronic documents;

obtain characteristic data of the entity from electronic data sources;

filter the obtained electronic documents based at least in part on the obtained characteristic data of the entity to identify which of the documents are pertinent to the entity, based on the characteristic data;

generate marked-up documents for the documents identified as pertinent;

use the marked-up documents to generate and store key terms for substantially each marked-up document; and process queries relating to the pertinent documents, by using the key terms to identify topics of importance to the entity; and a computer-usable medium encoding the computer instructions.

24. The program product of claim 23, wherein the computer-usable medium comprises one or more media selected from the group consisting of magnetic storage media, optical storage media, electronic storage media, optical communications media, electronic communications media, and wireless communications media.

25. The program product of claim 23, wherein:

the key terms are organized as vectors and comprise occurrence counts for key terms within the marked-up documents;

the computer instructions use the occurrence counts to identify topics of importance to the entity; and the computer instructions respond to a query by returning the identified topics.

26. The program product of claim 25, wherein the computer instructions use a simple matching coefficient measure of association to identify the topics of importance.

27. The program product of claim 23, wherein:

the entity comprises an organization that includes two or more units;

the characteristic data comprise different attributes for different units of the organization; and the computer instructions use the attributes to identify topics of importance to the entity.

28. The program product of claim 27, wherein the attributes comprise titles of individuals associated with the documents.

29. The program product of claim 23, wherein:

the entity comprises an organization that includes two or more members;

the documents comprise e-mail messages; and the computer instructions generate marked-up documents only for e-mail messages which were both sent and received by members of the organization.

30. The program product of claim 23, wherein:

the documents comprise e-mail messages;

substantially each e-mail message includes message attributes identifying a sender, a recipient, a subject, and a body; and the computer instructions use the message attributes to generate corresponding tags for the marked-up document.

31. The program product of claim 23, wherein:

the computer instructions obtain the documents from different types of data sources; and the computer instructions give the resulting marked-up documents a common format.

32. The program product of claim 23, wherein each marked-up document comprises items of content and a markup tag for each item of content.

33. The program product of claim 32, wherein the markup tags comprise extensible markup language (XML) tags.

34. The program product of claim 23, wherein:

the computer instructions generate entity-specific document statistics, based on the characteristic data and the marked-up documents; and the computer instructions store the entity-specific document statistics in one or more data cubes.

35. The method of claim 23 wherein the instructions that process queries further comprise instructions to use the characteristic data of the entity to identify topics of importance.

36. A program product for characterizing a set of information to determine common characteristics among subsets of the set of information, the program product comprising:

computer instructions that:

obtain characteristic data that describe characteristics of an entity, receiving electronic information;

filtering the received electronic information based in part on the obtained characteristic data of the entity to generate a set of filtered information;

obtain a set of the filtered information associated with the entity;

identify key terms within the set of filtered information;

classify the set of information into at least first and second subsets; and characterize the first subset as more important than the second subset, based on the key terms and the characteristic data for the entity; and a computer-usable medium encoding the computer instructions.

37. The program product of claim 36, wherein the computer-usable medium comprises one or more media selected from the group consisting of magnetic storage media, optical storage media, electronic storage media, optical communications media, electronic communications media, and wireless communications media.

38. A user interface that displays results obtained using the program product of claim 34, wherein the user interface indicates that the first subset is more important than the second subset.

39. The program product of claim 36, wherein:

the computer instructions that characterize the first subset as more important than the second subset comprise a query manager; and the computer-usable medium further encodes computer instructions that:
 transmit queries to the query manager;
 receive corresponding results form the query manager; and
 use the results to generate presentation data for display.

40. The program product of claim 36, wherein:

the entity comprises an organization;

the set of information comprises e-mail messages; and the computer instructions store counts of e-mail messages sent from and received by individual units of the organization.

41. The program product of claim 36, wherein:

the entity comprises an organization;

the set of information comprises e-mail messages; and the computer instructions store counts of e-mail messages between individual pairs of units within the organization.

42. The program product of claim 36, wherein the computer-usable medium further encodes computer instructions that:

generate marked-up documents from the set of information;

use the characteristic data and the marked-up documents to generate the entity-specific document statistics; and store the entity-specific document statistics in one or more data cubes.

43. The program product of claim 36, wherein:

the set of information comprises documents; and the computer instructions periodically identify key terms for documents obtained during a predetermined sampling period.

44. The program product of claim 43, wherein the computer-usable medium further encodes computer instructions that:

generate marked-up documents from the documents in the set of information;

process queries relating to the documents; and store the identified key terms automatically and substantially independently of the computer instructions for generating marked-up documents and processing queries.

45. The program product of claim 44, wherein the computer-usable medium further encodes computer instructions that:

use the characteristic data and the marked-up documents to generate entity-specific document statistics; and store the entity-specific document statistics for each sampling period in a different data cube.

46. The program product of clam 45, wherein the computer instructions respond to a query which specifies a time period of interest by consulting the data cubes for the sampling periods within the specified time period of interest.

47. A data processing system for extracting information from multiple documents, the data processing system comprising:

processing resources that:
 obtain electronic documents;
 obtain characteristic data of the entity from electronic data sources;
 filter the obtained electronic documents based at least in part on the obtained characteristic data of the entity to identify which of the documents are pertinent to the entity, based on the characteristic data;
 generate marked-up documents for the documents identified as pertinent;
 use the marked-up documents to generate and store key terms for substantially each marked-up document; and
 process queries relating to the pertinent documents, by using the key terms to identify topics of importance to the entity.

48. The method of claim 47 wherein the processing resources that process queries further comprise processing resources to use the characteristic data of the entity to identify topics of importance.

49. A method for presenting information derived from multiple documents, the method comprising:

submitting a request for information to a data mining system, wherein the data mining system:
 obtains electronic documents;
 obtains characteristic data from electronic data sources that describe characteristics of the entity;
 identifies which of the documents are pertinent to the entity based on the characteristic data using a document filter based at least in part on the obtained characteristic data of the entity; and
 generates marked-up documents for an entity from documents identified as pertinent to the entity, generates a key terms for substantially each marked-up document, and uses the key terms and characteristic data to process queries relating to the pertinent documents; and receiving a result from the data mining system; and presenting the result in a user interface.

50. An apparatus for characterizing information from multiple documents, the apparatus comprising:

means for obtaining documents;

means for obtaining characteristic data from electronic data sources that describe characteristics of the entity;

means for identifying which documents are pertinent to the entity using a document filter based at least in part on the obtained characteristic data of the entity;

means for generating marked-up documents for the documents identified as pertinent;

means for generating key terms for substantially each document identified as pertinent; and means for using the key terms and characteristic data to process queries relating to the pertinent documents.

51. A method of characterizing a set of information to determine common characteristics among subsets of the set of information, the method comprising:

obtaining characteristic data from a computer accessible database, wherein the characteristic data describe characteristics of an entity;

obtaining a set of information associated with the entity;

executing a data integrating component that automatically identifies key terms within the set of information and uses one or more key terms in a data processing system;

classifying the set of information into at least first and second subsets, based on the one or more vectors;

receiving a query relating to the set of information;

in response to the query, automatically using one or more of the key terms and the characteristic data for the entity to produce a result which ranks the first subset and the second subset in order of importance wherein the set of information comprises documents and the operation of identifying key terms within the set of information comprises periodically identifying key terms for documents obtained during a predetermined sampling period;

generating marked-up documents from the documents in the set of information;

processing queries relating to the documents;

storing the identified key terms automatically and substantially independently of the operations for generating marked-up documents and processing queries, using the characteristic data and the marked-up documents to generate entity-specific document statistics; and storing the entity-specific document statistics for each sampling period.

52. A program product for characterizing a set of information to determine common characteristics among subsets of the set of information, the program product comprising:

computer instructions that:

obtain characteristic data that describe characteristics of an entity;

obtain a set of information associated with the entity;

identify key terms within the set of information;

classify the set of information into at least first and second subsets;

characterize the first subset as more important than the second subset, based on the key terms and the characteristic data for the entity;

generate marked-up documents from the documents in the set of information;

process queries relating to the documents; and store the identified key terms automatically and substantially independently of the computer instructions for generating marked-up documents and processing queries;

use the characteristic data and the marked-up documents to generate entity-specific document statistics; and store the entity-specific document statistics for each sampling period;

a computer-usable medium encoding the computer instructions;

wherein the set of information comprises documents and the computer instructions periodically identify key terms for documents obtained during a predetermined sampling period.

* * * * *